(12) United States Patent
Vollmer et al.

(10) Patent No.: US 8,960,702 B2
(45) Date of Patent: Feb. 24, 2015

(54) ELECTRIC BICYCLE

(71) Applicant: Faraday Bicycles, Inc., Palo Alto, CA (US)

(72) Inventors: Adam Patrick Vollmer, Palo Alto, CA (US); Andrew Justin Taylor, San Jose, CA (US)

(73) Assignee: Faraday Bicycles, Inc., Palo Alto, CA (US)

( * ) Notice: Subject to any disclaimer, the term of this patent is extended or adjusted under 35 U.S.C. 154(b) by 47 days.

(21) Appl. No.: 13/854,771

(22) Filed: Apr. 1, 2013

(65) Prior Publication Data

US 2013/0214506 A1 Aug. 22, 2013

Related U.S. Application Data

(63) Continuation-in-part of application No. 13/625,666, filed on Sep. 24, 2012, now Pat. No. 8,408,349.

(60) Provisional application No. 61/538,118, filed on Sep. 22, 2011.

(51) Int. Cl.
  *B62J 6/12* (2006.01)
  *B62K 19/30* (2006.01)
  (Continued)

(52) U.S. Cl.
  CPC .................. *B62K 19/30* (2013.01); *B62M 6/40* (2013.01); *B62M 6/90* (2013.01); *B62K 19/34* (2013.01); *B62J 7/06* (2013.01)
  USPC .................. 280/281.1; 180/207.3; 180/206.1

(58) Field of Classification Search
  CPC ............ B62M 6/90; B62M 6/40; B62K 19/34
  USPC .......................... 280/281.1; 180/207.3, 206.1
  See application file for complete search history.

(56) References Cited

U.S. PATENT DOCUMENTS

| | | | |
|---|---|---|---|
| 500,177 A | 6/1893 | Winton | |
| 1,306,146 A | 6/1919 | Hawthorne | |

(Continued)

FOREIGN PATENT DOCUMENTS

| | | |
|---|---|---|
| CA | 2663788 A1 | 2/2008 |
| GB | 2451647 A | 2/2009 |

OTHER PUBLICATIONS

Dec. 14, 2012, International Search Report of the International Searching Authority from the U.S. Receiving Office, in PCTUS2012056935, which is another application of applicant Vollmer et al.

(Continued)

*Primary Examiner* — Kevin Hurley
*Assistant Examiner* — Michael Stabley
(74) *Attorney, Agent, or Firm* — Kolisch Hartwell, P.C.

(57) ABSTRACT

An electric bicycle and electric bicycle frame including batteries or a battery pack stored in one or more tubes of the frame. In some cases, a pair of top tubes extend rearward of the bicycle seat tube, and an electronics housing may be disposed between the rearward extending top tube portions. Alternatively or in addition, a removable bottom bracket shell portion and a removable bottom bracket insert may be provided, to allow convenient access to the interior portions of the down tube and/or seat tube of the frame. A battery pack and/or a battery electronics management unit may be conveniently within one or both of the down tube and the seat tube.

13 Claims, 12 Drawing Sheets

(51) Int. Cl.
    *B62M 6/40* (2010.01)
    *B62M 6/90* (2010.01)
    *B62K 19/34* (2006.01)
    *B62J 7/06* (2006.01)

(56) References Cited

U.S. PATENT DOCUMENTS

| | | | |
|---|---|---|---|
| 3,800,898 A | | 4/1974 | Griffin |
| 5,209,581 A | | 5/1993 | Nagano |
| 5,226,501 A | * | 7/1993 | Takata ................ 180/206.2 |
| 5,370,200 A | * | 12/1994 | Takata ................ 180/206.4 |
| 5,865,267 A | | 2/1999 | Mayer et al. |
| 6,016,882 A | * | 1/2000 | Ishikawa ................ 180/207.3 |
| 6,152,250 A | | 11/2000 | Shu-Hsien |
| 6,453,262 B1 | | 9/2002 | Kitamura |
| 6,983,949 B2 | | 1/2006 | Ueno et al. |
| 7,117,966 B2 | * | 10/2006 | Kohda et al. ................ 180/68.5 |
| 7,150,339 B2 | | 12/2006 | Liao et al. |
| 7,341,269 B2 | | 3/2008 | Horiuchi |
| 7,396,032 B2 | | 7/2008 | Horiuchi |
| 7,566,065 B2 | | 7/2009 | Fukui |
| 7,604,079 B2 | | 10/2009 | Pittman |
| 7,762,571 B2 | | 7/2010 | Dodman et al. |
| 7,934,576 B2 | | 5/2011 | Munksoe |
| 8,070,633 B2 | | 12/2011 | Bushnell |
| 8,183,726 B2 | | 5/2012 | Rittenhouse |
| 8,469,381 B2 | * | 6/2013 | Dodman et al. ............ 280/281.1 |
| 8,651,212 B2 | * | 2/2014 | Vincenz ................ 180/205.1 |
| 8,657,055 B2 | * | 2/2014 | Hecken ................ 180/207.3 |
| 2004/0163870 A1 | | 8/2004 | Liao et al. |
| 2005/0029033 A1 | | 2/2005 | Rip et al. |
| 2005/0126840 A1 | | 6/2005 | Lin |
| 2005/0217910 A1 | | 10/2005 | Yonehana et al. |
| 2006/0070785 A1 | | 4/2006 | Ducharme |
| 2008/0253708 A1 | | 10/2008 | Dodman et al. |
| 2011/0285328 A1 | | 11/2011 | Rittenhouse |

OTHER PUBLICATIONS

Dec. 14, 2012, Written Opinion of the International Searching Authority from The U S. Receiving Office, in PCTUS2012056935, which is another application of applicant Vollmer et al.

Feb. 20, 2014, International Search Report of the International Searching Authority from The U.S. Receiving Office, in PCT/US2013/061413, which shares the same priority as this U.S. application.

Dec. 14, 2012, Written Opinion of the International Searching Authority from The U.S. Receiving Office, in PCT/US2013/061413, which shares the same priority as this U.S. application.

Apr. 1, 2014, International Preliminary Report on Patentability of the International Searching Authority from The International Bureau of WIPO, in PCT/US2012/056935, which is an international application of Faraday Bicycles, Inc. which shares the same priority as this U.S. application.

* cited by examiner

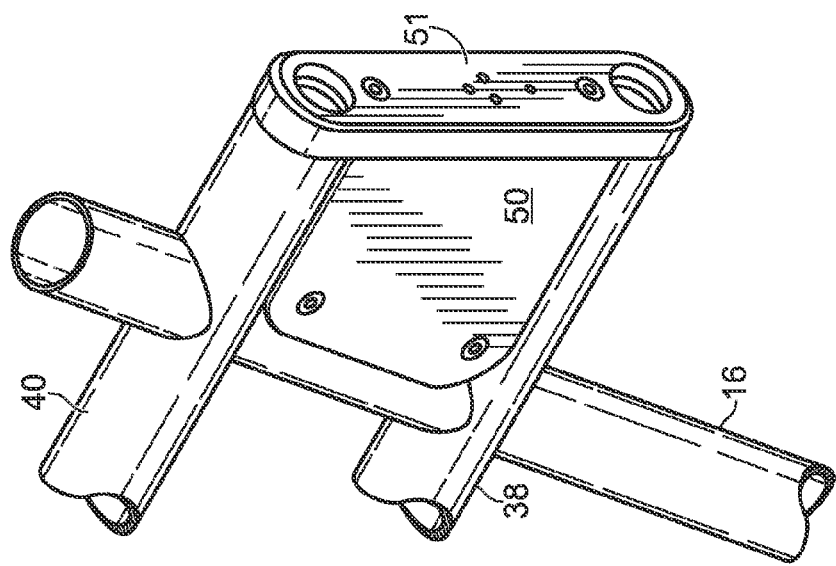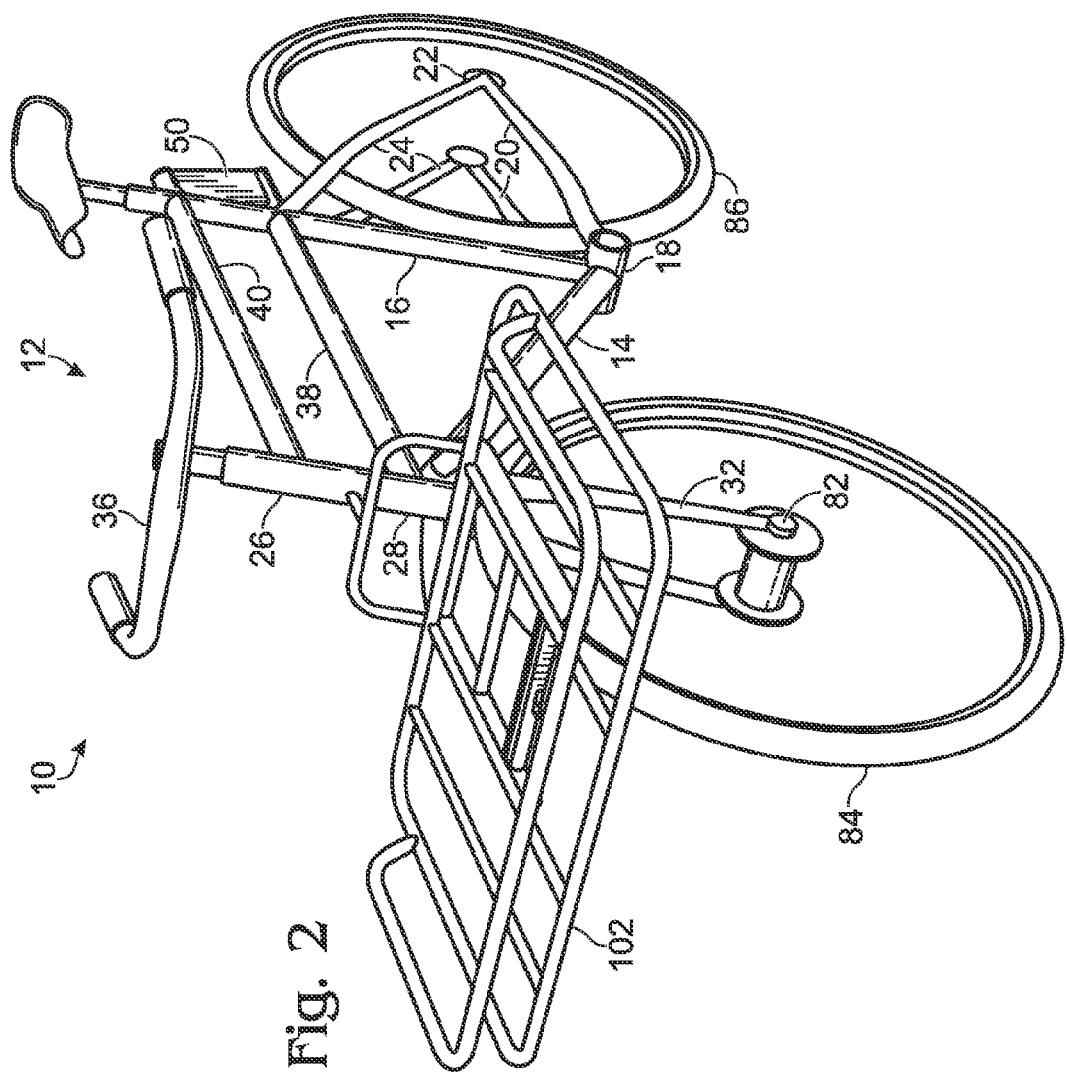

ELECTRIC BICYCLE

CROSS-REFERENCE TO RELATED APPLICATION

This application claims priority to U.S. Provisional Patent Application Ser. No. 61/538,118, filed Sep. 22, 2011, which is hereby incorporated by reference.

BACKGROUND

Conventional electric bicycles typically rely on a battery pack and electronics incorporated into one or more housings that are attached by various means to the outside of the bicycle frame. External batteries and electronics have drawbacks including, but not limited to, adding extra weight, consuming storage space on the bike, negatively affecting the distribution of weight on the bike, and hurting the aesthetics of the bicycle design.

In addition, existing electrical assist algorithms for electrical bicycles typically do not take into account the continuity of the bicycle's speed and acceleration, resulting in bursts of power from the electric motor that may be unexpected and/or excessively forceful and that may compromise the rider's safety or enjoyment when riding the bicycle. Accordingly, improvements to electric bicycles are needed, including improved battery and electronics configurations and improved electrical assist algorithms.

SUMMARY

The present teachings disclose aspects of an electric bicycle and electric bicycle frame including batteries or a battery pack stored in one or more tubes of the frame. In some cases, a pair of top tubes extend rearward of the bicycle seat tube, and an electronics housing may be disposed between the rearward extending top tube portions. Alternatively or in addition, a removable bottom bracket shell portion and a removable bottom bracket insert may be provided, to allow convenient access to the interior portions of the down tube and/or seat tube of the frame. A battery pack and/or a battery electronics management unit may be conveniently disposed within one or both of the down tube and the seat tube.

BRIEF DESCRIPTION OF DRAWINGS

FIG. 2 is an isometric view of the electric bicycle of FIG. 1.

FIG. 3 is an isometric view of a rear portion of the frame of the electric bicycle of FIGS. 1-2, showing further details of an electronics housing disposed between rearward extending portions of the bicycle top tubes.

DETAILED DESCRIPTION

Figure 1:
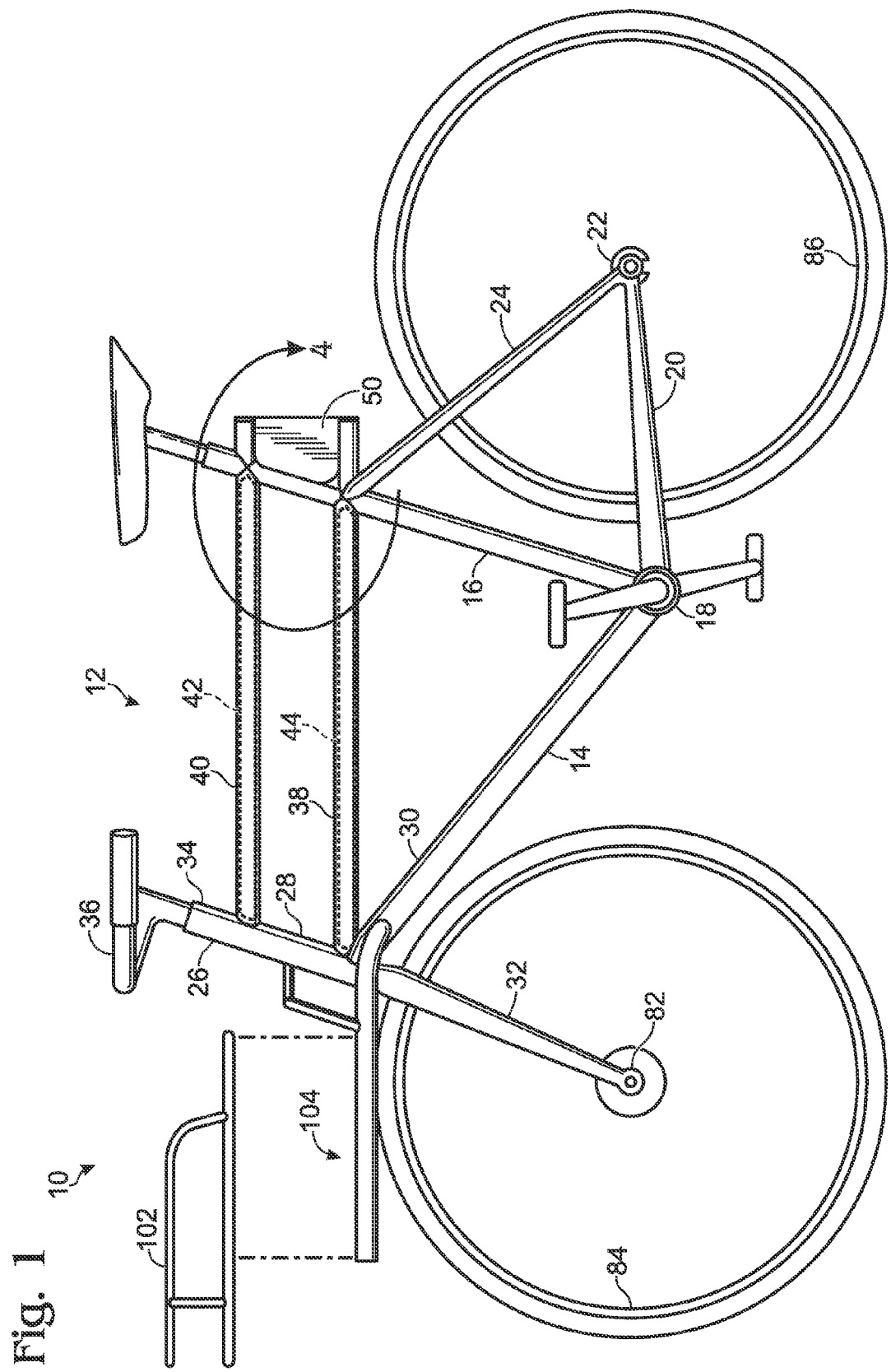
FIG. 1 is a side elevational view of an electric bicycle, according to aspects of the present teachings.

The present teachings generally relate to electric bicycles having batteries integrated into a bicycle frame and configured to be electrically connected to an electronics housing in a particular manner. The present teachings also relate to other aspects of an electric bicycle, including a novel front rack and accessory mounting system.

A goal of the designs disclosed in the present teachings is to allow electrical components, which may include batteries, battery balancing and protection electronics, motor controllers, cables and wires, and other circuits, to be incorporated inside the tubes of the bicycle frame. The present teachings are particularly intended to enable the design of an electric bicycle using a "conventional" "double-diamond" or "step-through" frame design, where the batteries are located inside tubing that is small (less than 2") in diameter. Various aspects of the present teachings are described below and in the drawings.

FIGS. 1-2 schematically depict an electric bicycle, generally indicated at 10, according to aspects of the present teachings. Bicycle 10 includes a frame, generally indicated at 12, having various tubes that are joined together by any of a number of standard methods known in the art, such as welding, brazing, molding and/or the like. The particular method of joining the tubes depends to a large degree on the chosen frame material. Typical materials used to construct a bicycle frame include steel, aluminum, titanium and carbon fiber, although other materials may be used.

Frame 12 includes a down tube 14, a seat tube 16 intersecting a lower portion of the down tube at a bottom bracket region 18, a pair of chain stays 20 each extending backward from the bottom bracket region to a rear wheel dropout 22, and a pair of seat stays 24 each extending generally upward and forward from a corresponding one of the rear wheel dropouts to intersect the seat tube. The frame further includes a head tube 26 having a lower portion 28 that intersects an upper portion 30 of the down tube and which is configured to receive a steerer tube of a bicycle fork 32, and an upper portion 34 which is configured to receive a stem of a bicycle handlebar 36. In other words, down tube 14 extends generally downward and rearward from the lower portion of the head tube.

In addition, frame 12 includes a first or lower top tube 38 extending between either the lower portion of the head tube or an upper portion of the down tube and the seat tube, and a second or upper top tube 40 extending between the upper portion of the head tube and the seat tube. More generally, the upper top tube extends generally rearward from an upper portion of the head tube, and the lower top tube extends rearward from a portion of the frame below the upper top tube. Whether this portion of the frame is the lower portion of the head tube or an upper portion of the down tube is a matter of design choice that typically depends on the overall frame size. As depicted in FIG. 1, seat tube 16 intersects each of upper top tube 40, lower top tube 38 and down tube 14.

As also depicted, for example, in FIG. 1, top tubes 38 and 40 each may be configured to hold a battery or a battery pack for powering an electric motor of bicycle 10. For instance, each top tube may contain a plurality of battery cells connected in series to form batteries 42, 44, which are inserted into the top tubes.

Also as depicted in FIG. 1, top tubes 38 and 40 each extend rearward of seat tube 16 to some extent, i.e. beyond its intersection with the seat tube. This allows an electronics housing 50 to be disposed rearward of the seat tube, between the first and second (i.e., upper and lower) top tubes. In other cases, the electronics housing may be disposed in front of the seat tube, but still between the top tubes. In still other cases, the controlling electronics may be disposed elsewhere than in a housing between the top tubes, such as in a bag that may be removably attached to a portion of the bicycle frame or to a rack. When electronics housing 50 is disposed at the rear of the frame as in FIG. 1, a rearward portion of the housing may include one or more lights, such as integrated safety lights 51 configured to receive power from the batteries stored within the frame.

Electronics housing 50 is configured to be electrically connected to batteries 42, 44 stored within the top tubes. Specifically, in the embodiment depicted in FIGS. 1-4, upper and lower battery end caps 52, 54 are provided and configured to fit around seat tube 16 and each to provide an electrical conduit, generally indicated at 56, 58 in FIG. 4, between a respective one of the batteries and electronics housing 50. Conduits 56, 58 each include a pair of detents indicated at 60, 62 formed in opposing lateral sides of the respective battery end cap and configured to allow passage of wires from the battery to the electronics housing. For example, substantially flat wires 64, 66 are shown passing through detents 60, 62 in FIG. 4. Another similar wire (not shown) passes through a similar detent on the opposing lateral side of each battery end cap and carries the opposite electrical polarity.

Figure 4:
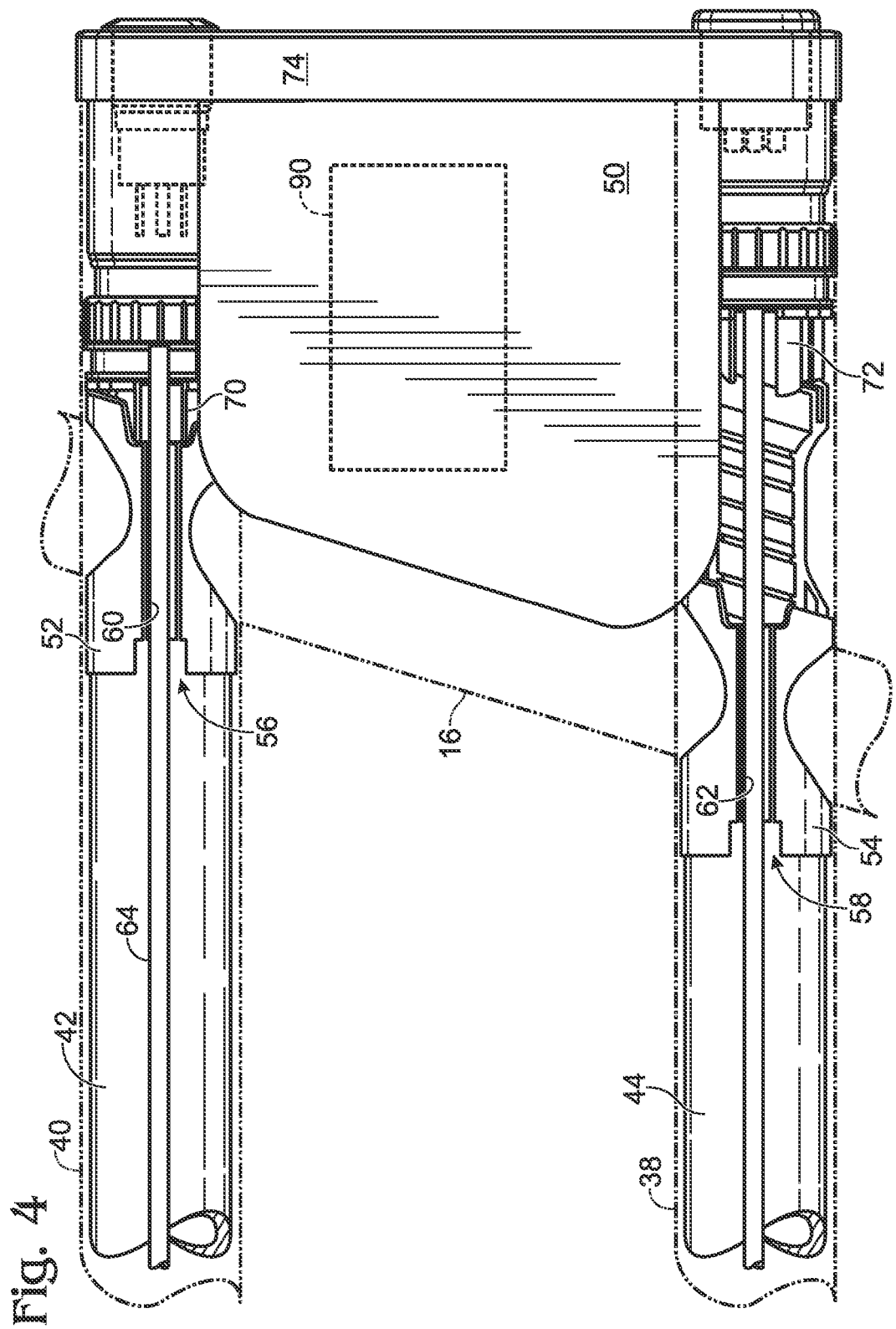
FIG. 4 is a semi-transparent side elevational view of the electronics housing of FIG. 3, showing details of battery end caps disposed within the housing and facilitating electrical connection between the bicycle batteries and the electronics housing.

In other cases, an electrical conduit between each battery and the electronics housing may be formed in some other manner, such as by passing a wire through or around the seat tube, with or without the use of a battery end cap of the type shown in FIG. 4. Furthermore, according to the present teachings, conduits provided by battery end caps need not be configured to accommodate flat wires, but instead may have any other shape configured to accommodate electrical connectors of any desired type, such as cylindrical wires.

Electronics housing typically includes upper and lower "male" electrical plugs 70, 72, which are configured to form an electrical connection with a respective one of the battery end caps by interfacing with a corresponding "female" connector in each end cap. Other forms of electrical connection between the electronics housing and the battery end caps are possible, including reversing the disposition of the "male" and "female" connectors, or eliminating those connectors entirely and instead using some other form of electrical connection, such as banana plugs, or simply wiring the batteries directly to the electronics housing. However, the plug configuration depicted in FIG. 4 allows convenient installation and removal of the electronics housing from the electric bicycle. Similarly, the electronics housing itself may include a removable rear portion 74, within which one or more lights such as light 51 may be disposed.

In addition to the various tubes described previously, bicycle 10 also will typically include various other parts of a working electric bicycle, such as a front fork 32 extending generally downward from the lower portion of the head tube and providing a pair of front wheel dropouts 82, a front wheel 84, and a rear wheel 86. Furthermore, the electric bicycle will include an electric motor (not shown) attached to some portion of the bicycle drive train, such as to the front wheel hub, rear wheel hub, or bottom bracket, although other attachments are also possible.

The batteries stored in the top tubes are generally configured to provide locomotive power to the electric bicycle, typically through a power controller, generally indicated at 90, which is disposed in the electronics housing. Controller 90 is configured to provide power from the batteries to the motor of the bicycle according to a control algorithm. This can be accomplished through an electrical connection between the controller and the motor. This electrical connection may include wires disposed entirely within the bicycle frame, although in some cases one or more segments of wire may be disposed outside the frame.

Figure 5:
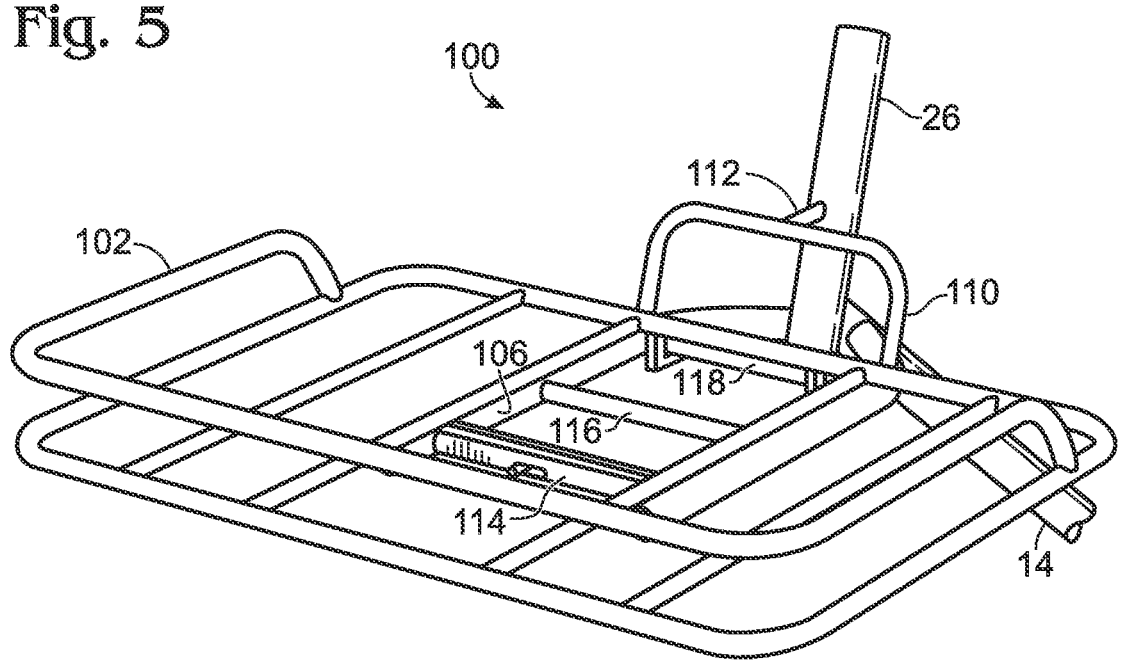
FIG. 5 is an isometric view of a front portion of the frame of the electric bicycle of FIGS. 1-2, showing further details of a front rack and a mounting portion of the bicycle frame that facilitates attachment of the front rack.
Figure 6:
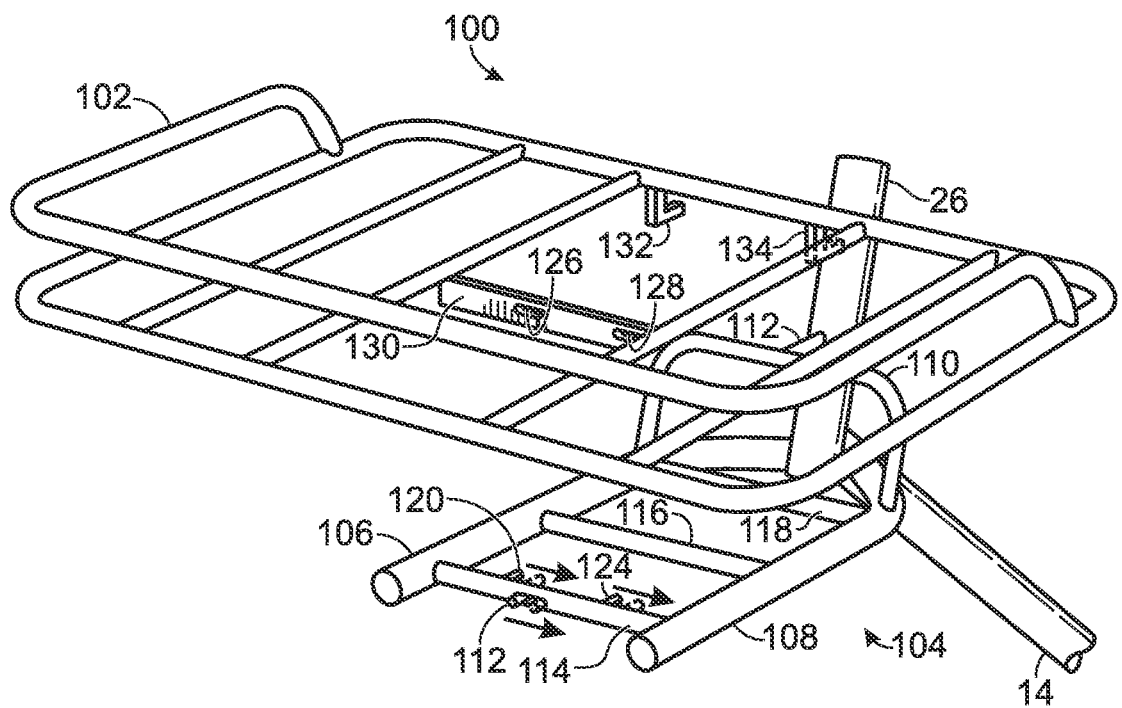
FIG. 6 is a partially exploded view similar to the view of FIG. 5, depicting the front rack disengaged from the bicycle frame.

FIGS. 5-6 depict close-up views of a rack system, generally indicated at 100, suitable for mounting a rack on the front portion of a bicycle such as electric bicycle 10. Rack system 100 includes a rack 102 that is configured to connect with an integrated mounting portion 104 of bicycle frame 12. In FIGS. 5-6, mounting portion 104 takes the form of a pair of substantially horizontal mounting tubes 106, 108 connected to down tube 14 on opposing lateral sides of the down tube. An angled bridge portion 110 connects the horizontal mounting tubes to head tube 26 via a connecting tube 112 that passes between a central portion of the head tube and bridge portion 110. Three transverse tubes 114, 116, 118 provide additional structural integrity to mounting portion 104 and provide an attachment mechanism for rack 102, as described in more detail below.

More specifically, as can be seen in FIG. 6, transverse tube 114 includes a plurality of movable protrusions 120, 122, 124, all of which are attached to a spring-biased member (not shown) that can slide within transverse tube 114. As indicated by the arrows in FIG. 6, these three protrusions may be slid from left to right in order to engage the rear protrusions 120, 124 with complementary slots 126, 128 in a connection member 130 of rack 102. This is typically done by a user by manually moving front protrusion 122, which causes the spring-biased member and thus the rear protrusions also to move. In addition, rack 102 includes L-shaped brace members 132, 134 configured to fit under transverse tube 118 of mounting portion 104.

To engage the rack with the mounting portion, a user angles the rack slightly downward, fits brace members 132, 134 under transverse tube 118, lowers the rack toward the horizontal, slides protrusion 122 to the right causing protrusions 120, 124 also to move toward the right, engages protrusions 120, 124 with complementary slots 126, 128 of connection member 130, lowers the rack to a completely horizontal position, and then releases protrusion 122, allowing spring-biased protrusions 120, 124 to slide back toward the left within slots 126, 128. At this point, rack 102 will be securely engaged with mounting portion 104 by the combination of brace members 132, 134 disposed under transverse tube 118, and protrusions 120, 124 engaged within slots 126, 128.

Although a specific attachment mechanism for mounting rack 102 to mounting portion 104 is shown in FIGS. 5-6 and described above, the present teachings contemplate more general attachment mechanisms. For example, any number of attachment protrusions may be used, rather than exactly two for engaging the rack and one for providing manual input from a user. Furthermore, the size and shape of these protrusions, and of the mechanism that allows a user to move the protrusions, may be varied. In addition, the protrusions themselves may be located on either the mounting portion of the frame (as shown in FIGS. 5-6) or on the rack itself (not shown), in which case the complementary slots will be disposed on the mounting portion of the frame.

Generally speaking, any number, size or shape of mounting protrusions may be used and disposed either on the rack itself or the mounting portion of the frame, in conjunction with complementary slots or apertures of suitable design. Similarly, different, sizes, shapes and numbers of brace members may be used, and in some cases no brace members at all may be used, in which case another set of mounting protrusions and complementary apertures may be used instead. The mounting protrusions need not be spring biased, but in some cases instead may be biased toward or otherwise securable in a mounting position by some other suitable mechanism.

The present teachings also contemplate that the attachment mechanism used to engage rack 102 with frame mounting portion 104 may be used to attach things other than rack 102 to the bicycle. For example, the attachment mechanism may be used to attach racks of other sizes and/or styles, bags such as panniers, baskets, platforms, child-carrying seats or the like. In other words, frame mounting portion 104 may be configured with a universal interface that allows the secure attachment of a plethora of interchangeable accessories to the bicycle frame.

The present teachings also contemplate configurations other than those described above of batteries, battery packs, battery management electronics, and battery controllers for electric bicycles. The following examples describe several such alternative configurations; see FIGS. 7-15.

More specifically, many electric bicycle designs exist in which the battery pack is located in the down tube. However, in most of these designs, the battery is removed either from the top or side of the down tube, or through the bottom by offsetting the down tube so that it does not pierce the bottom bracket shell. According to the present teachings, a battery pack may be inserted into the down tube from the lower end of the down tube, through the bottom bracket shell. The battery pack may be inserted into the down tube through the bottom bracket in several ways, as described below.

Figure 7:
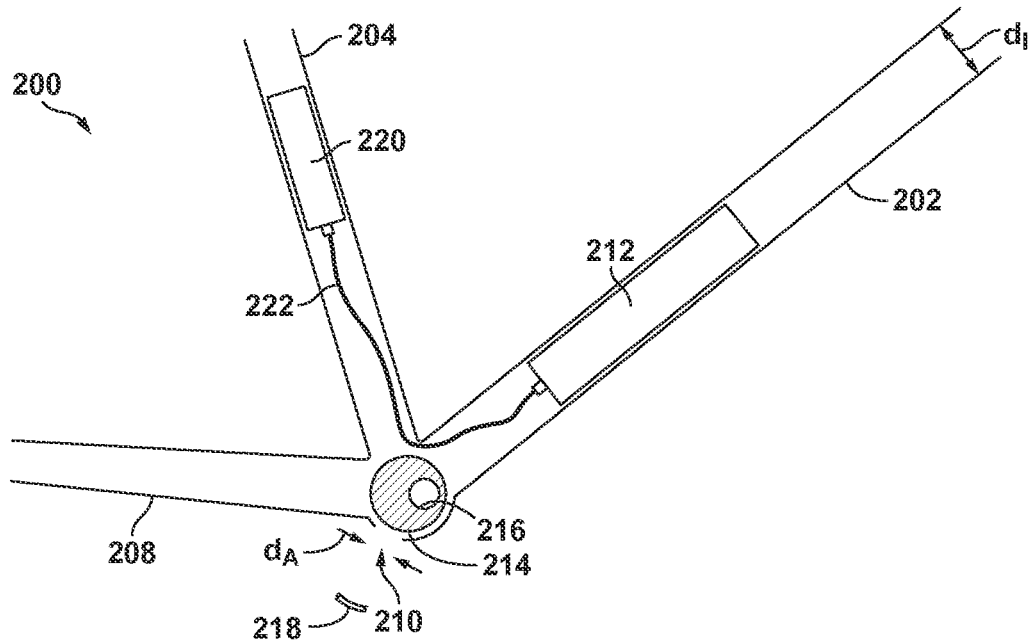
FIG. 7 is a schematic side elevational view of a battery pack, battery electronics and a bottom bracket disposed within the tubes of a bicycle frame, according to aspects of the present teachings.
Figure 8:
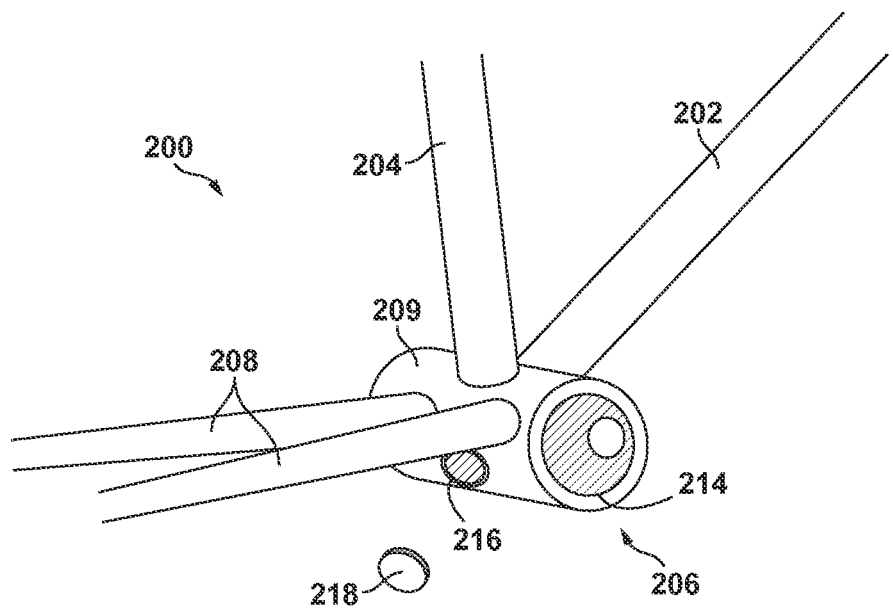
FIG. 8 is an isometric view of a central portion of the bicycle frame depicted in FIG. 7.

FIG. 7 is a schematic side elevational view of a battery pack, battery electronics and a bottom bracket disposed within the tubes of a bicycle frame, generally indicated at 200, according to aspects of the present teachings. FIG. 8 is an isometric view of a central portion of bicycle frame 200 depicted in FIG. 7. In the design of FIGS. 7-8, the bottom bracket shell is oversized and contains an eccentric bottom bracket insert. This allows the bicycle chain to be tensioned by rotating the insert, while using a standard crankset and bottom bracket. In the design of FIGS. 7-8, the oversized bottom bracket shell also allows for a larger diameter hole in the bottom bracket shell, and therefore a larger battery pack may be inserted through the hole and into the down tube.

Certain aspects of bicycle frame 200 are similar to corresponding aspects of frame 12 of bicycle 10 described above and shown in FIGS. 1-2. To the extent that these elements have already been sufficiently described and shown, they may not be described and/or shown again. For example, frame 200 generally includes a head tube and at least one top tube extending generally rearward from the head tube, neither of which is shown in FIG. 7. A down tube 202 extends generally downward and rearward from the head tube, and a seat tube 204 intersects the top tube and also intersects down tube 202 at a bottom bracket region generally indicated at 206. A pair of seat stays (not shown in FIG. 7) extends generally downward and rearward from an upper portion of seat tube 204, and a pair of chain stays 208 extend generally rearward from the bottom bracket region to intersect the seat stays. All of this structure is generally similar to the structure of bicycle frame 12 shown in FIGS. 1-2, although frame 200 need not include two top tubes, and the top tube(s) of frame 200 need not be horizontal and need not extend behind the seat tube.

Bottom bracket region 206 includes a bottom bracket shell 209 having an aperture 210 disposed substantially opposite down tube 202 and configured to allow a battery pack 212 to be inserted into the interior of the down tube. A removable bottom bracket insert 214 is configured to fit within bottom bracket shell 209. Typically, the bottom bracket insert will be configured to slide laterally into position within the bottom bracket shell. Bottom bracket insert 214 includes a hollow bore 216 shaped to receive a bottom bracket. Hollow bore 216 may be centered within bottom bracket insert 214, or the hollow bore may be disposed off-center within the bottom bracket insert, as depicted in FIGS. 7-8. In any case, the bottom bracket insert, rather than the bottom bracket shell, will provide the surrounding support structure for the bottom bracket. In some cases, the hollow bore may include threads to receive an English or Italian threaded bottom bracket such as are well known in the art, whereas in other cases the hollow bore may be unthreaded and configured to receive a press-fit bottom bracket, which is a well known alternative to a threaded bottom bracket.

A removable cover 218 is configured to fit over aperture 210 of the bottom bracket shell. In some cases, cover 218 may be configured to securely engage both the bottom bracket shell and the bottom bracket insert, and thereby to hold the bottom bracket insert in place within the shell. In other cases, cover 218 may engage only the bottom bracket shell, in which case some other mechanism may be used to hold the bottom bracket insert within the bottom bracket shell, such as threaded engagement at one or both lateral edge portions of the shell, press fitting, end caps (not shown), and/or the like.

As depicted in FIG. 8, in some cases aperture 210 may be substantially circular, with a diameter $d_A$ approximately equal to an inner diameter $d_i$ of the down tube. This may facilitate convenient insertion of a battery pack designed to fit securely within the down tube. In addition to allowing battery pack 212 to be inserted into the interior of the down tube when the bottom bracket insert is removed from the shell, aperture 210 also may have a size and a position configured to allow a battery management electronics unit 220 to be inserted into seat tube 204. For instance, the diameter of the aperture may be larger than the inner diameter of the seat tube, so that the battery management electronics unit may be angled into position through the aperture. After insertion into their respective frame tubes, battery pack 212 and battery management electronics unit 220 may be electrically connected, for instance using a wire 222.

Figure 9:
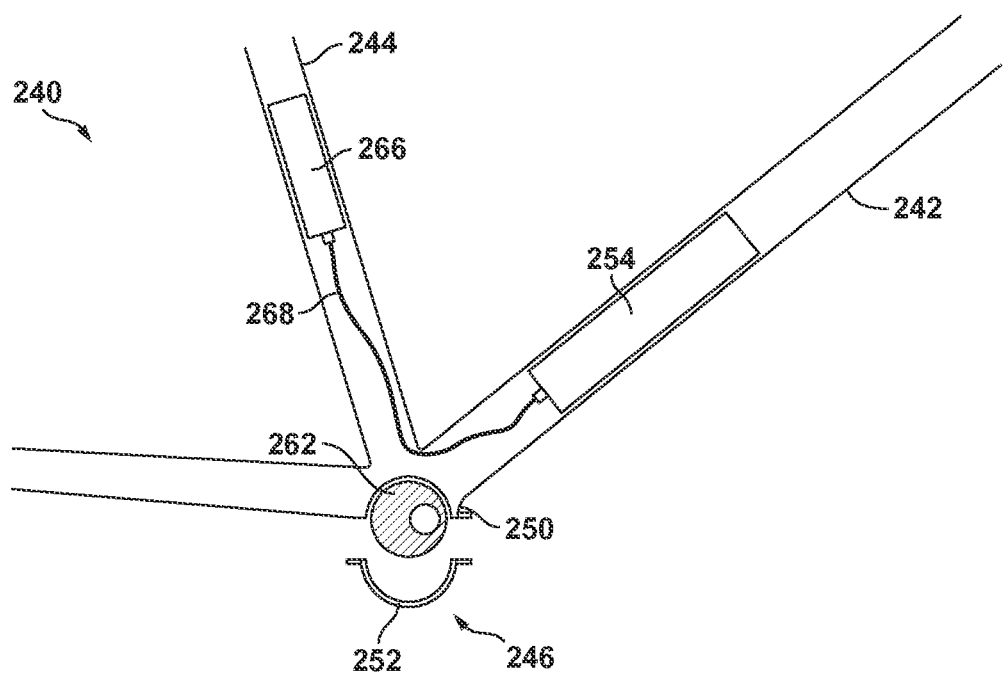
FIG. 9 is a schematic side elevational view of a battery pack, battery electronics and a bottom bracket disposed within the tubes of another bicycle frame, according to aspects of the present teachings.
Figure 10:
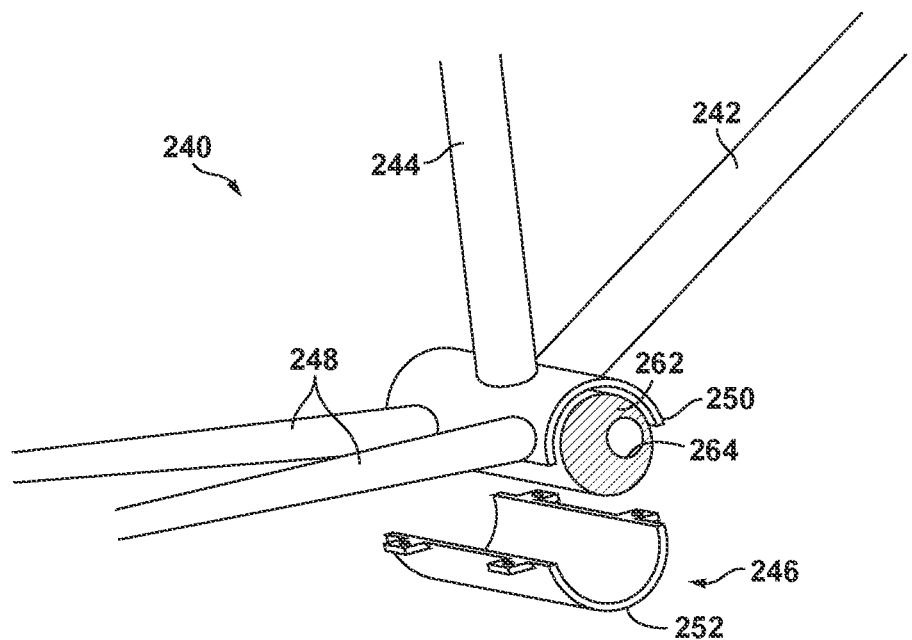
FIG. 10 is an isometric view of a central portion of the bicycle frame depicted in FIG. 9.
Figure 11:
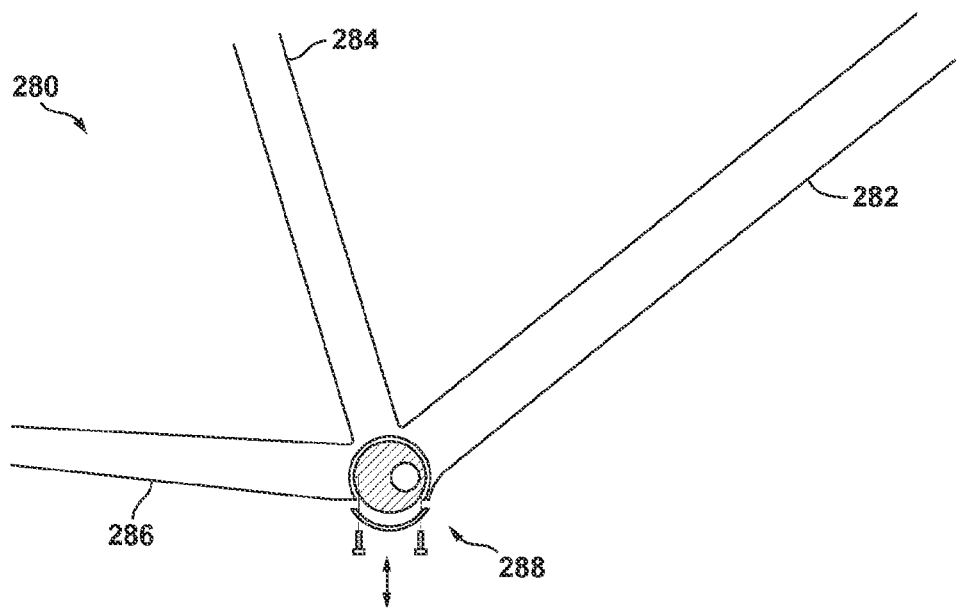
FIG. 11 is a schematic side elevational view of a battery pack, battery electronics and a bottom bracket disposed within the tubes of yet another bicycle frame, according to aspects of the present teachings.
Figure 12:
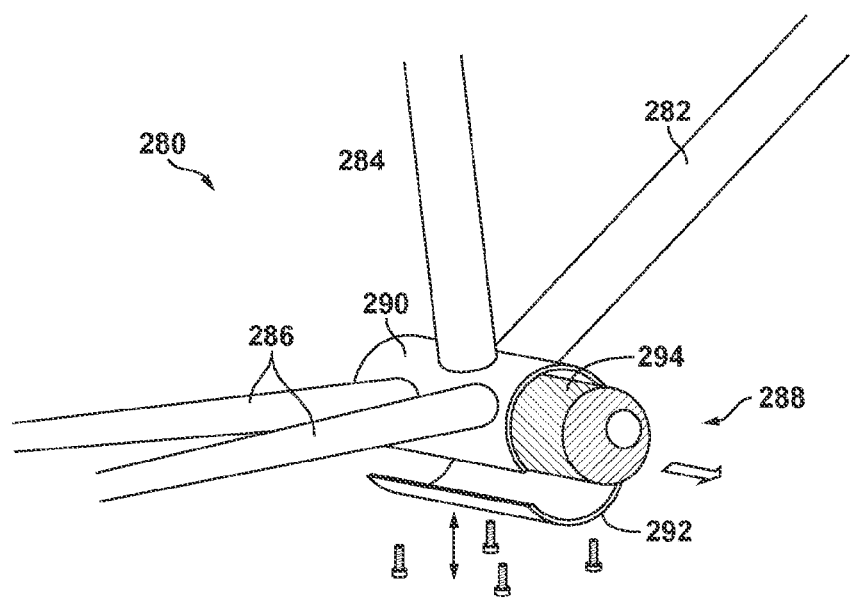
FIG. 12 is an isometric view of a central portion of the bicycle frame depicted in FIG. 11.

FIG. 9 is a schematic side elevational view of a battery pack, battery electronics and a bottom bracket disposed within the tubes of another bicycle frame generally indicated at 240, according to aspects of the present teachings. FIG. 10 is an isometric view of a central portion of the bicycle frame depicted in FIG. 9. In this design, the battery or battery pack is removed and installed in the down tube by removing a lower portion of an oversized bottom bracket shell, exposing the inside of the down tube and possibly also the inside of the seat tube. This design has several advantages. The eccentric insert installed in the split bottom bracket shell may be removed either fully assembled or disassembled, providing the mechanic or operator performing the service more options and possibly requiring less work.

This design also allows access to the inside of the down tube and seat tube, for accessing the battery and making electrical connections. Furthermore, the eccentric insert may be designed with the necessary reliefs, holes, and ports to allow cable or electrical wire routing within the bottom bracket area. In this design, the eccentric may be located in position laterally either by the use of some internal ribs or locating features that allow rotation while centering it on the bike, or by external flanges or locating features that reference the exterior or the split shell, or simply by visual alignment by the operator. This design is very flexible in that it allows the use of any conventional threaded or pressed bottom bracket and crankset.

As in the case of bicycle frame 200, frame 240 will generally include various elements described above and shown in previous drawings, such as a top tube, a head tube, and seat stays. In fact, frame 240 is generally similar to frame 200 with the exception of the structure of the bottom bracket region, as described below. Specifically, as in the case of frame 200, in frame 240 a down tube 242 extends generally downward and rearward from the head tube, and a seat tube 244 intersects the top tube and also intersects down tube 242 at a bottom bracket region generally indicated at 246. A pair of seat stays (not shown) extends generally downward and rearward from an upper portion of seat tube 244, and a pair of chain stays 248 extend generally rearward from the bottom bracket region to intersect the seat stays. With the exception of the bottom bracket region, all of this structure is similar to what has been described previously.

Bottom bracket region 246 includes a first bottom bracket shell portion 250 fixedly attached to the bicycle frame, and a second bottom bracket shell portion 252 detachable from the bicycle frame and configured to allow a battery pack 254 to be inserted into the down tube when the second bottom bracket shell portion is detached from the bicycle frame. The second, detachable bottom bracket shell portion may be removably attached to the first bottom bracket shell portion by any suitable means, such as bolts 256 or other similar hardware passing through aligned apertures 258, 260 in the two bottom bracket shell portions.

A removable bottom bracket insert 262 is configured to fit within bottom bracket shell portions 250, 252 when those portions are assembled together. Typically, the bottom bracket insert will be configured to slide laterally into position within the loosely assembled or partially assembled bottom bracket shell portions, which then may be tightened or fully assembled to retain the bottom bracket insert securely.

Bottom bracket insert 262 is similar to bottom bracket insert 214 described previously, including a hollow bore 264 shaped to receive a bottom bracket. Hollow bore 264 may be centered within bottom bracket insert 262, or the hollow bore may be disposed off-center within the bottom bracket insert, as depicted in FIGS. 9-10. In any case, the bottom bracket insert, rather than the bottom bracket shell, will provide the surrounding support structure for the bottom bracket. In some cases, the hollow bore may include threads to receive an English or Italian threaded bottom bracket such as are well known in the art, whereas in other cases the hollow bore may be unthreaded and configured to receive a press-fit bottom bracket, which is a well known alternative to a threaded bottom bracket.

It should be apparent from FIGS. 9-10 that when lower bottom bracket shell portion 252 is detached from upper bottom bracket shell portion 250 (and thus detached from frame 240), the resulting aperture will provide access to the interiors of both down tube 242 and seat tube 244. Accordingly, battery pack 254 may be inserted into the down tube when shell portion 252 is detached, and furthermore a battery management electronics unit 266 may be inserted into the seat tube when shell portion 252 is detached. When disposed within the seat tube, battery management electronics unit 266 is configured to be attached to the battery pack when the battery pack is disposed within the down tube, for instance via wire 268.

FIGS. 11-15 depict assorted variations of the two-part bottom bracket shell described above and shown in FIGS. 9-10. Specifically, FIGS. 11-12 disclose a first variation in which a bicycle frame, generally indicated at 280, includes a down tube 282, a seat tube 284, and a pair of chain stays 286, which intersect at a bottom bracket region generally indicated at 288. Bottom bracket region 288 includes a first or upper bottom bracket shell portion 290, which is fixedly attached to the bicycle frame, and a second or lower bottom bracket shell portion 292, which is detachable from the bicycle frame and configured to allow a battery pack (not shown) to be inserted into the down tube when detached from the bicycle frame. In addition, frame 280 may be configured to allow a battery management electronics unit to be inserted into the seat tube when bottom bracket shell portion 292 is detached. As in the previous examples, a removable bottom bracket insert 294 is configured to fit within bottom bracket shell portions 290, 292 when those portions are assembled together.

Bottom bracket insert 294 is generally similar in structure and function to the previously described bottom bracket inserts, and will not be described again here. However, unlike in the previous examples, in FIGS. 11-12, the first bottom bracket shell portion 290 subtends an angle sufficiently large to retain the bottom bracket insert when the second bottom bracket shell portion is detached. Thus, bottom bracket insert 294 may be conveniently slid in and out of bottom bracket shell portion 290, but will not fall through the aperture formed when bottom bracket shell portion 292 is detached and removed.

Figure 13:
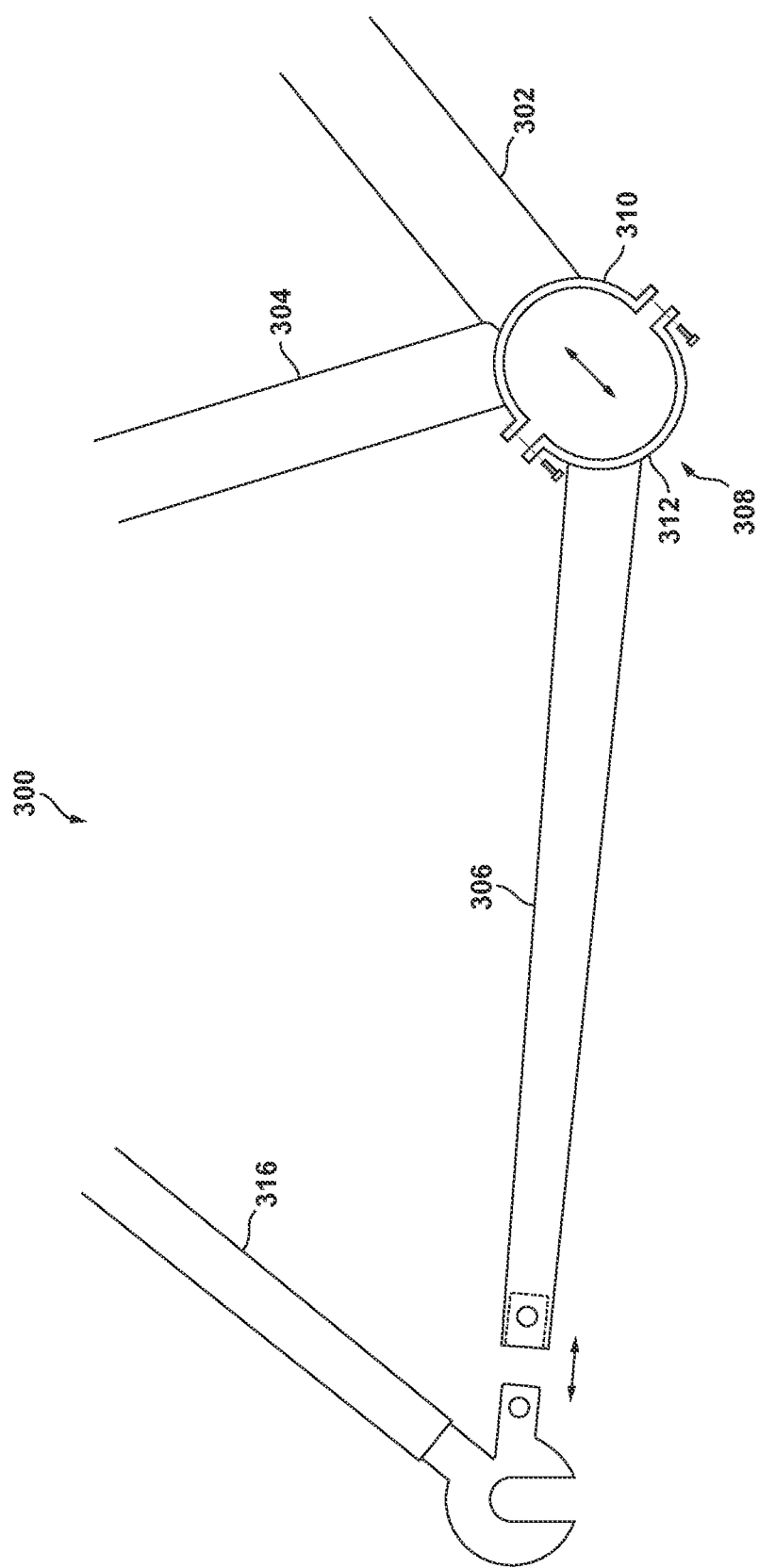
FIG. 13 is an exploded side elevational view of a lower portion of a bicycle frame, according to aspects of the present teachings.
Figure 14:
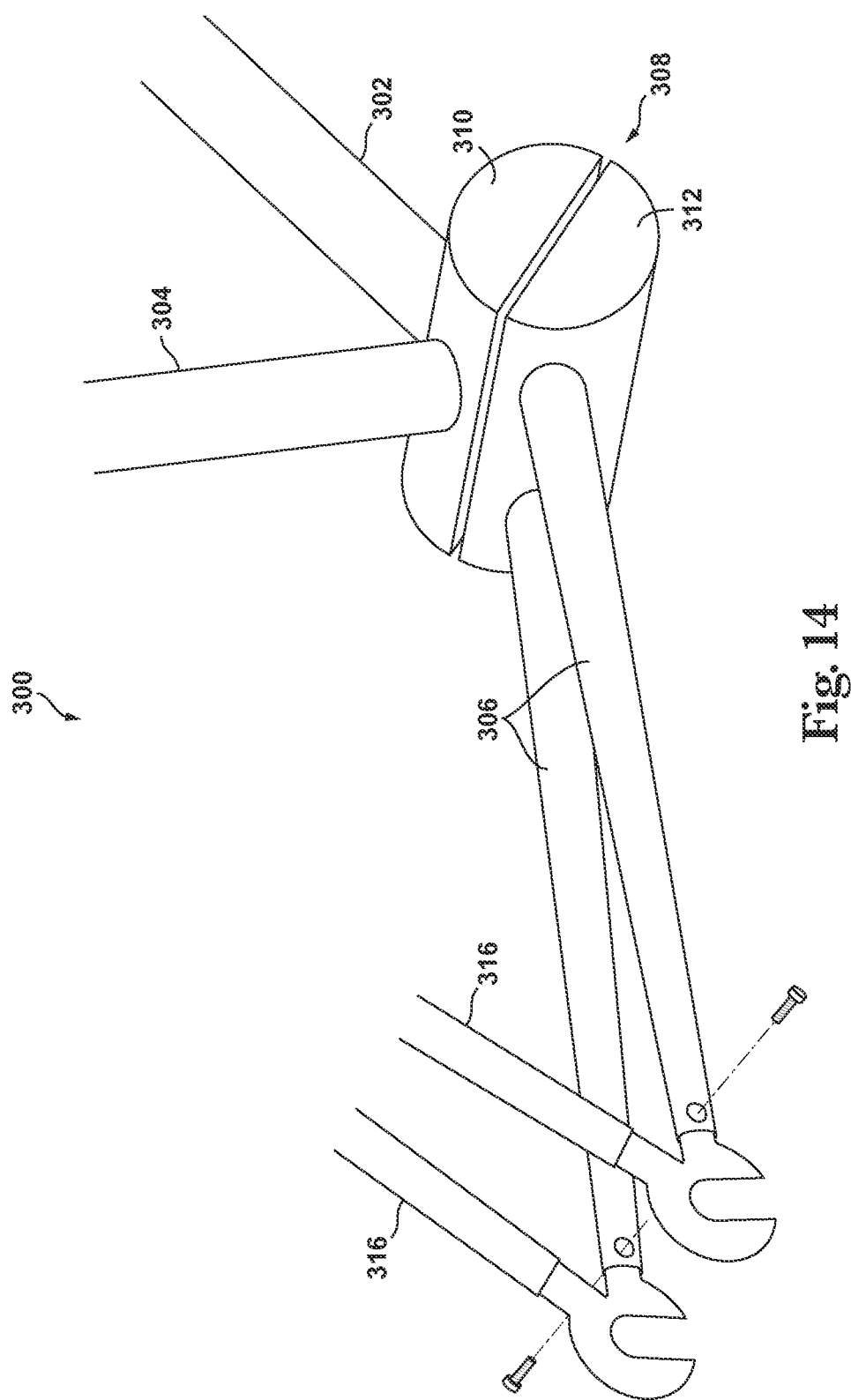
FIG. 14 is an isometric view of the bicycle frame portion of FIG. 13 in an assembled state.

FIGS. 13-14 depict another variation in which a bicycle frame, generally indicated at 300, includes a down tube 302, a seat tube 304, and a pair of chain stays 306, which intersect at a bottom bracket region generally indicated at 308. Bottom bracket region 308 includes a first or upper bottom bracket shell portion 310, which is fixedly attached to the bicycle frame, and a second or lower bottom bracket shell portion 312, which is detachable from the bicycle frame and configured to allow a battery pack (not shown) to be inserted into the down tube when detached from the bicycle frame. In addition, frame 300 may be configured to allow a battery management electronics unit to be inserted into the seat tube when bottom bracket shell portion 312 is detached. As in the previous examples, a removable bottom bracket insert is configured to fit within bottom bracket shell portions 310, 312 when those portions are assembled together.

The bottom bracket insert is generally similar in structure and function to the previously described bottom bracket inserts, and will not be described again here. However, unlike in the previous examples, in FIGS. 13-14, the second bottom bracket shell portion 312 includes substantially the entirety of chain stays 306, so that the chain stays are removable along with the lower bottom bracket shell portion. For example, chain stays 306 and the remainder of lower bottom bracket shell portion 312 may be welded or otherwise joined together according to any of the suitable and well known methods of permanently joining bicycle frame tubes. This integral component then may be joined both to upper bottom bracket shell portion 310 and also to a pair of seat stays 316, using suitable hardware and aligned apertures as depicted in FIGS. 13-14.

Figure 15:
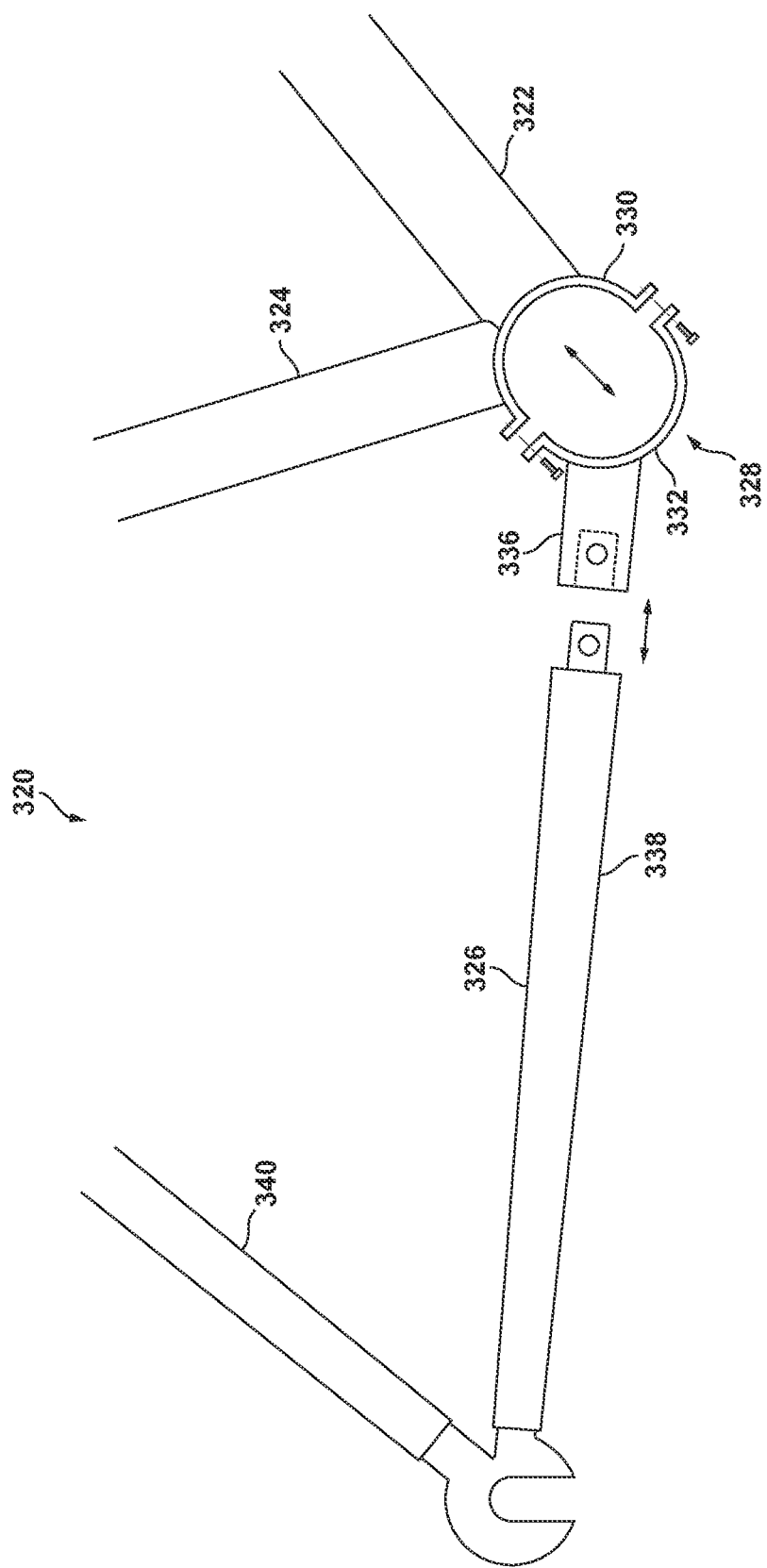
FIG. 15 is an exploded side elevational view of a lower portion of another bicycle frame, according to aspects of the present teachings.

FIG. 15 is an exploded side elevational view of a lower portion of yet another bicycle frame variation, generally indicated at 320, according to aspects of the present teachings. Frame 320 includes a down tube 322, a seat tube 324, and a pair of chain stays 326, which intersect at a bottom bracket region generally indicated at 328. Bottom bracket region 328 includes a first or upper bottom bracket shell portion 330, which is fixedly attached to the bicycle frame, and a second or lower bottom bracket shell portion 332, which is detachable from the bicycle frame and configured to allow a battery pack (not shown) to be inserted into the down tube when detached from the bicycle frame. In addition, frame 320 may be configured to allow a battery management electronics unit to be inserted into the seat tube when bottom bracket shell portion 332 is detached. As in the previous examples, a removable bottom bracket insert is configured to fit within bottom bracket shell portions 330, 332 when those portions are assembled together.

The bottom bracket insert is generally similar in structure and function to the previously described bottom bracket inserts, and will not be described again here. However, unlike in the previous examples, in FIG. 15, the second bottom bracket shell portion 312 includes a portion 336, but not the entirety, of chain stays 326, so that portion 336 of the chain stays is removable along with the lower bottom bracket shell portion. For example, portion 336 of chain stays 326 and the remainder of lower bottom bracket shell portion 332 may be welded or otherwise joined together according to any of the suitable and well known methods of permanently joining bicycle frame tubes, whereas another portion 338 of chain stays 326 may be similarly joined to a pair of seat stays 340. The two portions 336 and 338 of the chain stays then may be attached to each other, for example using suitable hardware and aligned apertures as indicated in FIG. 15.

Figure 16:
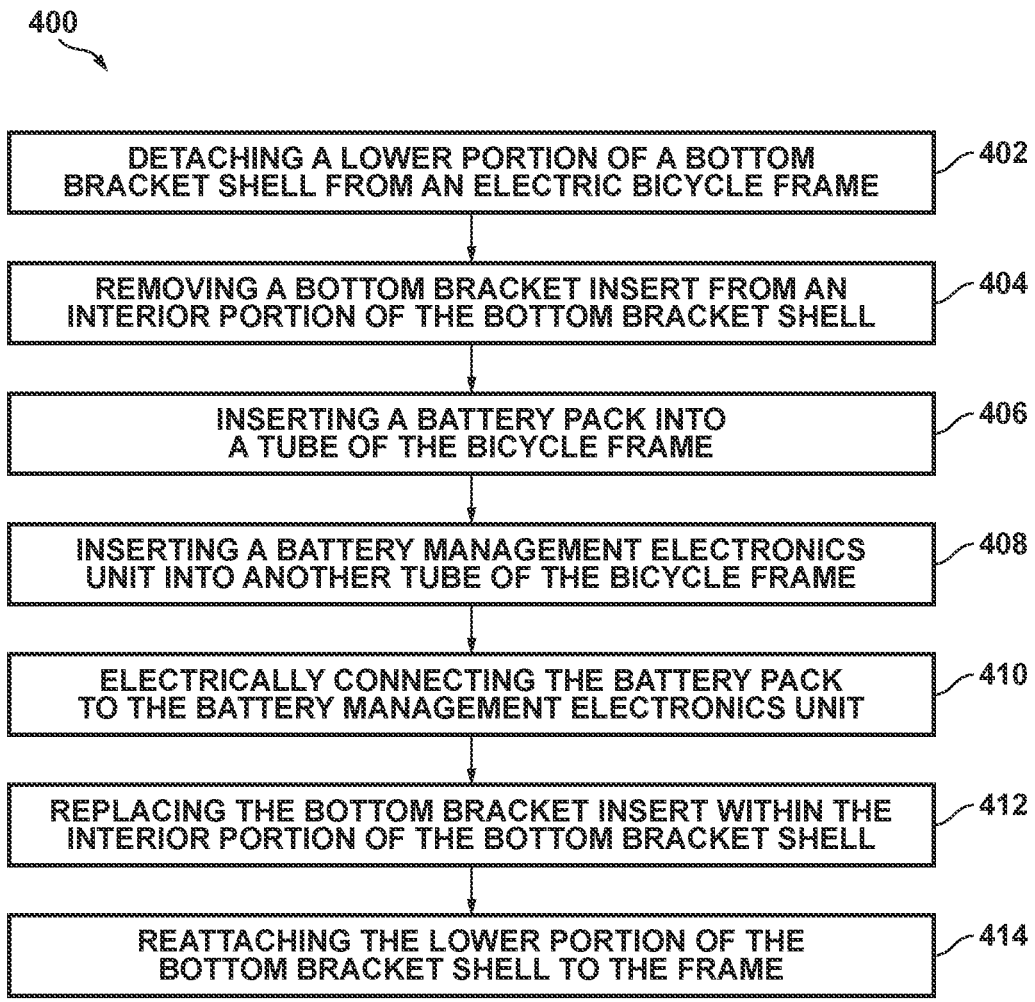
FIG. 16 is a flow chart depicting a method of installing a battery into a tube of a bicycle frame, according to aspects of the present teachings.

FIG. 16 is a flow chart depicting a method, generally indicated at 400, of installing a battery pack into a tube of a bicycle frame, according to aspects of the present teachings. Method 400 may be performed, for example, in conjunction with some or all of the frame configurations described above and depicted in FIGS. 7-15. Step 402 includes detaching a lower portion of a bottom bracket shell from an electric bicycle frame to create an aperture, which will generally be configured to provide access to the interior of a down tube and/or a seat tube of the bicycle frame.

As depicted in FIGS. 7-8, the detachable portion of the bottom bracket shell may be a relatively small detachable cover, such as a substantially circular cover with a diameter approximately equal to an inner diameter of the down tube. Alternatively, as depicted in FIGS. 9-15, the detachable portion of the bottom bracket shell may be a portion of the bottom bracket shell that extends laterally along the bottom bracket shell, typically across the entire width of the shell.

Step 404 includes removing a bottom bracket insert from an interior portion of the bottom bracket shell, so that the bottom bracket shell will not block access to the tubes. Step 406 includes inserting a battery pack through the aperture and into a down tube of the bicycle frame. Step 408 includes inserting a battery management electronics unit through the aperture and into a seat tube of the bicycle frame, and step 410 includes electrically connecting the battery pack to the battery management electronics unit. Step 412 includes replacing the bottom bracket insert within the interior portion of the bottom bracket shell, and step 414 includes reattaching the lower portion of the bottom bracket shell to the frame.

Figure 17:
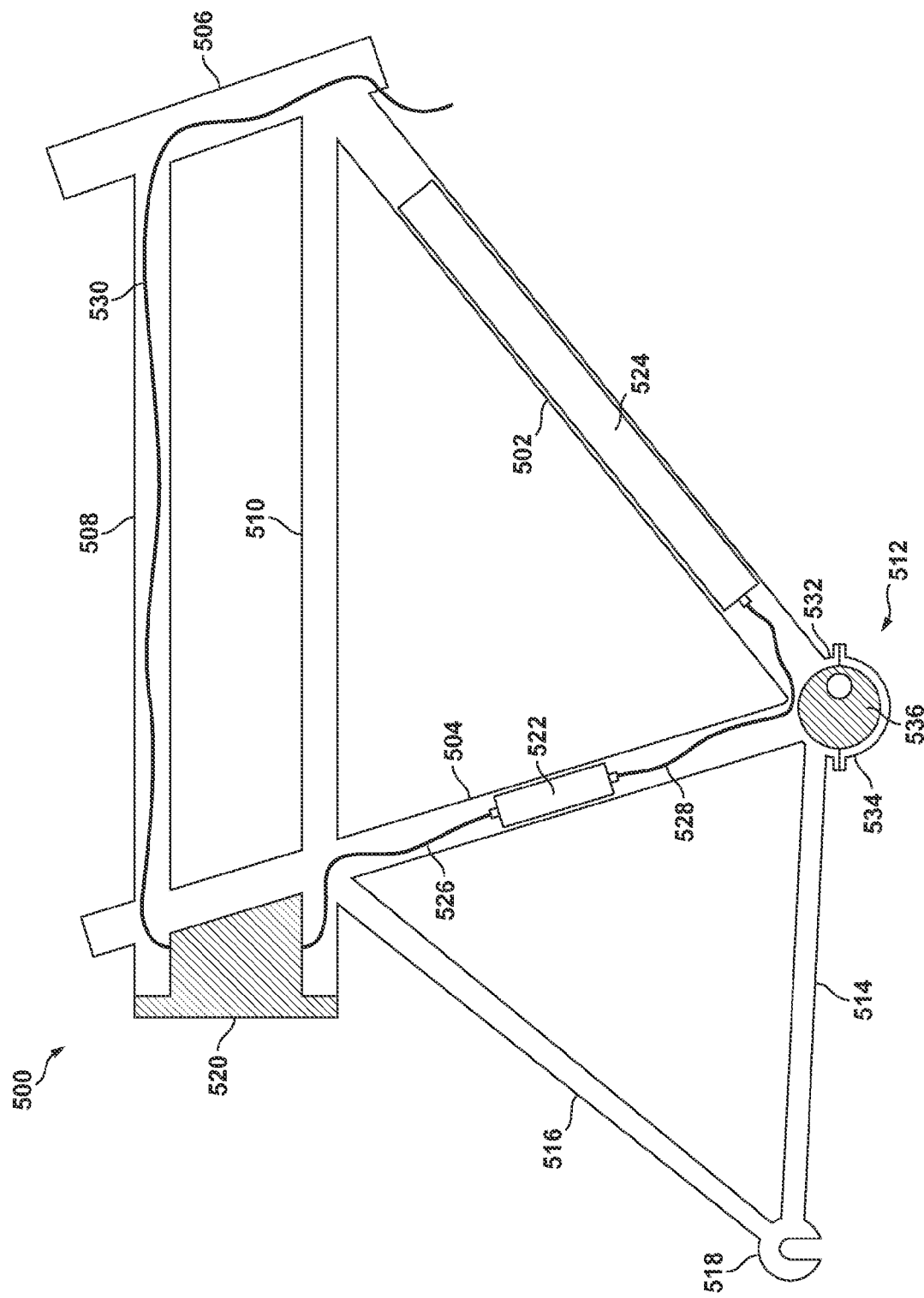
FIG. 17 is a schematic side elevational view of a bicycle frame including a battery pack, battery electronics, and a battery controller, according to aspects of the present teachings.

FIG. 17 is a schematic side elevational view of a bicycle frame, generally indicated at 500, including a battery pack, battery electronics, and a battery controller, according to aspects of the present teachings. Frame 500 is an example showing how various aspects of the present teachings could be combined. In other cases, however, only a subset of the present teachings may be incorporated into an electric bicycle frame configuration.

Frame 500 includes a down tube 502, a seat tube 504, and a head tube 506. A pair of top tubes 508, 510 extends generally rearward from the head tube to intersect the seat tube, and each top tube further extends some additional distance behind the seat tube. The down tube and the seat tube intersect at a bottom bracket region 512, and a pair of chain stays 514 extends generally rearward from the bottom bracket region. A pair of seat stays 516 extends generally downward and rearward from the seat tube, to intersect the chain stays at a pair of rear wheel dropouts 518.

As described previously, for example with respect to FIGS. 1-4, a housing 520 may be disposed between the top tubes and rearward of the seat tube, and may contain various electronics such as a battery power controller. This controller may be electrically connected to a battery management electronics unit 522 disposed within the seat tube, and/or to a battery pack 524 disposed within the down tube, with wires 526, 528 as depicted in FIG. 17. Additional wires 530 could be used to connect the battery controller to peripheral accessories, such as lights.

In order to use a conventional seat post, a method for running wires around the seat post may be required. This may be accomplished, for example, as shown in FIG. 4 and described previously. Specifically, a sleeve that fits snugly within one or both of the top tubes may be provided, with an angled hole allowing the seat post to pass through the sleeve. These sleeves are depicted at 52, 54 in FIG. 4, where they are described as "battery end caps." However, the sleeve structure may be used to route wiring around the seat post regardless of whether batteries are present in the top tubes. The plastic or metal walls of the sleeve provide a protective barrier from the seat post, allowing electrical wires to be run along the outside of this protective sleeve, between the sleeve and the inner diameter of the upper tube. These electrical wires may be one or more conductors, and may be round, flat, or other shapes. The assembly would typically include some insulation to protect the wires from the wall of the bicycle tube. This protective sleeve may or may not be attached to the controller housing at the rear of the bicycle.

Also as described previously, bottom bracket region may include a fixedly attached bottom bracket shell portion 532, and a detachable bottom bracket shell portion 534, which can contain a bottom bracket insert 536. Removal of detachable bottom bracket shell portion 534 and bottom bracket insert 536 provides access to the interior portions of the down tube and/or the seat tube, to allow the battery pack and/or the battery management electronics unit to be installed, maintained and replaced. Any of the bottom bracket structures described previously and shown in FIGS. 7-15, as well as the method described and shown in FIG. 16, could be used in conjunction with exemplary frame 500.

The present teachings encompass many modifications and combinations of features described above. For example, the battery pack may be disposed in the seat tube, and the battery management electronics unit may be disposed in the down tube of the bicycle frame. Furthermore, one of these components may be disposed elsewhere within, or attached to, the frame. The bottom bracket insert also may take various alternative forms. In particular, it need not have a circular cross section, as long as it has a hollow bore that matches the shape of the bottom bracket to be used. Thus, the bottom bracket insert may have essentially an arbitrary cross sectional shape, which may be chosen to facilitate its use described above. Other features described above and shown in the drawings also may be modified or omitted.

What is claimed is:

1. A frame for an electric bicycle, comprising:
   a head tube;
   a top tube extending generally rearward from the head tube;
   a down tube extending generally downward and rearward from the head tube;
   a seat tube that intersects the top tube and that intersects the down tube at a bottom bracket region, wherein the bottom bracket region includes a bottom bracket shell having an aperture disposed substantially opposite the down tube to allow a battery pack to be inserted into the down tube;
   a pair of seat stays extending generally downward and rearward from an upper portion of the seat tube; and
   a pair of chain stays extending generally rearward from the bottom bracket region to intersect the seat stays;
   a removable bottom bracket insert that fits within the bottom bracket shell and includes a hollow bore shaped to receive a bottom bracket.

2. The electric bicycle frame of claim 1, wherein the hollow bore is configured to receive a press-fit bottom bracket.

3. The electric bicycle frame of claim 1, wherein the hollow bore is disposed off-center within the bottom bracket insert.

4. The electric bicycle frame of claim 1, further comprising a removable cover configured to fit over the aperture of the bottom bracket shell.

5. The electric bicycle frame of claim 4, wherein the removable cover is configured to securely engage both the bottom bracket shell and the bottom bracket insert, and thereby to hold the bottom bracket insert in place within the shell.

6. The electric bicycle frame of claim 1, wherein the bottom bracket insert is configured to slide laterally into position within the bottom bracket shell.

7. The electric bicycle frame of claim 1, wherein the aperture is further configured to allow a battery management electronics unit to be inserted into the seat tube.

8. The electric bicycle frame of claim 1, wherein the aperture is substantially circular with a diameter approximately equal to an inner diameter of the down tube.

9. A frame for an electric bicycle, comprising:
   a head tube;
   a top tube extending generally rearward from the head tube;
   a down tube extending generally downward and rearward from the head tube and configured to receive a battery pack;
   a seat tube that intersects the top tube and that intersects the down tube at a bottom bracket region, wherein the bottom bracket region includes a first bottom bracket shell portion fixedly attached to the bicycle frame, and a second bottom bracket shell portion detachable from the bicycle frame to allow a battery pack to be inserted into one of the tubes of a bicycle frame when the second bottom bracket shell portion is detached from the bicycle frame;
   a pair of seat stays extending generally downward and rearward from an upper portion of the seat tube;
   a pair of chain stays extending generally rearward from the bottom bracket region to form a pair of rear wheel dropouts in conjunction with the seat stays; and
   a removable bottom bracket insert that fits between the bottom bracket shell portions and includes a hollow bore shaped to receive a bottom bracket.

10. The electric bicycle frame of claim 9, wherein the hollow bore is configured to receive a press-fit bottom bracket.

11. The electric bicycle frame of claim 9, wherein the hollow bore is disposed off-center within the bottom bracket insert.

12. The electric bicycle frame of claim 9, wherein the first bottom bracket shell portion subtends an angle sufficiently large to retain the bottom bracket insert when the second bottom bracket shell portion is detached.

13. A frame for an electric bicycle, comprising:
   a head tube;
   a top tube extending generally rearward from the head tube;
   a down tube extending generally downward and rearward from the head tube and configured to receive a battery pack;
   a seat tube that intersects the top tube and that intersects the down tube at a bottom bracket region;
   a pair of seat stays extending generally downward and rearward from an upper portion of the seat tube;
   a pair of chain stays extending generally rearward from the bottom bracket region to form a pair of rear wheel dropouts in conjunction with the seat stays;
   wherein the bottom bracket region includes a first bottom bracket shell portion fixedly attached to the bicycle frame, and a second bottom bracket shell portion detachable from the bicycle frame to allow a battery pack to be inserted into one of the tubes of the bicycle frame when the second bottom bracket shell portion is detached from the bicycle frame; and
   wherein the second bottom bracket shell portion includes at least a portion of each chain stay.

* * * * *

UNITED STATES PATENT AND TRADEMARK OFFICE
CERTIFICATE OF CORRECTION

Page 1 of 1

PATENT NO.        : 8,960,702 B2
APPLICATION NO.   : 13/854771
DATED             : February 24, 2015
INVENTOR(S)       : Adam Patrick Vollmer et al.

It is certified that error appears in the above-identified patent and that said Letters Patent is hereby corrected as shown below:

In The Claims

In Claim 1 after "a pair of seat stays extending generally downward and rearward from an upper portion of the seat tube;":, delete "and"

In Claim 1 after "a pair of chain stays extending generally rearward from the bottom bracket region to intersect the seat stays;":, add "and"

Signed and Sealed this
Tenth Day of May, 2016

Michelle K. Lee
*Director of the United States Patent and Trademark Office*